United States Patent [19]

Marchesani

[11] Patent Number: 4,473,522
[45] Date of Patent: Sep. 25, 1984

[54] CRACK ELIMINATION IN SOAP

[75] Inventor: Cesare N. Marchesani, Maywood, N.J.

[73] Assignee: Colgate-Palmolive Company, New York, N.Y.

[21] Appl. No.: 488,509

[22] Filed: Apr. 25, 1983

Related U.S. Application Data

[63] Continuation-in-part of Ser. No. 314,641, Oct. 26, 1981, abandoned.

[51] Int. Cl.³ .............................................. B29C 17/14

[52] U.S. Cl. .................................... 264/145; 252/109; 252/134; 252/367; 264/75; 264/148; 264/320; 264/325; 425/308; 425/382 R

[58] Field of Search ...................... 264/145, 148, 210.2, 264/75, 320, 325; 425/382 R, 464, 308, 310-311, 296-297, 325, 327; 252/134, 367, 109, 90

[56] References Cited

U.S. PATENT DOCUMENTS

| | | | |
|---|---|---|---|
| 3,784,533 | 1/1974 | Mach | 425/296 |
| 3,899,566 | 8/1975 | Murray | 264/245 |
| 3,923,438 | 12/1975 | Perla | 425/131.1 |
| 3,993,722 | 11/1976 | Borcher et al. | 264/75 |
| 4,036,775 | 7/1977 | Trautvetter et al. | 264/75 |
| 4,067,946 | 1/1978 | Rickert | 264/150 |
| 4,090,829 | 5/1978 | Fischer et al. | 425/73 |
| 4,096,221 | 6/1978 | Fischer et al. | 264/75 |
| 4,147,053 | 4/1979 | Marchesani | 73/104 |
| 4,162,288 | 7/1979 | Hunt et al. | 264/325 |
| 4,201,743 | 5/1980 | Perla et al. | 264/75 |

FOREIGN PATENT DOCUMENTS

| | | | |
|---|---|---|---|
| 2112602 | 10/1971 | Fed. Rep. of Germany | 264/75 |
| 7106260 | 11/1972 | Netherlands | 264/75 |

*Primary Examiner*—Jeffery Thurlow
*Attorney, Agent, or Firm*—Herbert S. Sylvester; Murray M. Grill; John A. Stemwedel

[57] ABSTRACT

A process for the elimination of wet surface cracking in dual extruded soaps including the steps of extruding two streams of plodded soap from a single cone dual extrusion nozzle, cutting the two streams of plodded soap at right angles to the extrusion axis to form plodder soap blanks or billets of a predetermined size, rotating the plodder soap blanks or billets 90° on the extrusion axis, introducing the rotated plodder soap blanks or billets into a soap press having movable die elements so that the transverse faces of the plodder soap blanks or billets are in registry with the movable die elements, pressing the rotated plodder soap blanks or billets on their transverse faces to form pressed soap bars, and removing pressed soap bars. The process provides soap bars having an essentially laminar or parallel stress pattern.

6 Claims, 14 Drawing Figures

PRIOR ART

PRIOR ART

PRIOR ART

PRIOT ART

CRACK ELIMINATION IN SOAP

CROSS-REFERENCE TO RELATED APPLICATION

This is a Continuation-in-Part application of Ser. No. 06/314,641, filed Oct. 26, 1981 and now abandoned.

BACKGROUND OF THE INVENTION

1. Field of the Invention

This invention relates to the art of soap making, and more particularly to a process for elimination of wet cracking and stress cracking in soap.

2. Description of the Prior Art

New test methods for evaluating soap bar and cake wet cracking problems are disclosed in U.S. Pat. No. 4,147,053. Based on the application of these new tests and the observations of the results, it has been discovered that toilet soap bars made by the single extrusion process showed a somewhat laminar or parallel crack pattern in the cross sectional test. These bars, in general, did not develop severe wet surface cracks when subjected to the wash room usage test. Contrastingly, bars made by the dual extrusion process have a generally non-parallel crack pattern with radical spurs radiating always preferentially to one side and across the short axis of the bars. These bars, when field tested, would consistently develop severe wet surface cracks always significantly more on one side than the other. The prior art dual extrusion process leads to problems in the formation of wet surface cracks during use of the bars since the stress pattern of the bars is such that upon use with water, the forces which tend to hold the lamina in the bar together are weakened, and, hence, there was a need to devise a means for imparting a laminar or parallel crack pattern to finished soap bars made via the dual extrusion process.

In the past, high moisture containing soap bars have been produced by plodding a soap mass and forcing it through a compression cone with a dual extrusion nozzle so that the two streams of plodded soap which may be divided into plodder soap blanks or billets which can be fed into a duplopress to provide increased line speed and efficiency. However, changes in the soap formula (i.e., lowering the moisture) and different selections of bar shapes generally result in finished soap bars with unusual and excessive surface cracking on the faces of the bars with one side having a more pronounced cracking pattern than the other. This problem is directly related to the dual extrusion soap plodding process and the conventional method of pressing the plodder soap blanks or billets on their internal cut faces and external cut faces.

SUMMARY OF THE INVENTION

It is an object of the invention to overcome the difficulties of the prior art.

It is another object of the invention to produce finished soap bars which will not develop wet cracking during use.

It is still another object of the invention to produce finished soap bars having parallel or laminar stress patterns.

These and other objects will be met as the description of the invention proceeds.

The invention provides a process for the elimination of wet surface cracking in dual extruded soaps comprising the steps of extruding two streams of plodded soap from a single cone dual extrusion nozzle, cutting the two streams of plodded soap at right angles to the extrusion axis to form plodder soap blanks or billets of a predetermined size, rotating the plodder soap blanks or billets of a predetermined size, introducing the rotated plodder soap blanks or billets into a soap press having movable die elements so that the transverse faces of the plodder soap blanks or billets are in registry with the movable die elements, pressing the rotated plodder soap blanks or billets on their transverse faces to form pressed soap bars, and removing the pressed soap bars.

BRIEF DESCRIPTION OF DRAWINGS

Other advantages of the invention will hereinafter become more fully apparent from the detailed description of the preferred embodiments of the invention when considered in conjunction with the accompanying drawings throughout which like reference characters indicate like parts and in which.

DETAILED DESCRIPTION OF INVENTION

To more fully understand present invention, it is necessary to specify the meaning of some terms. By "direction of extrusion" or "extrusion axis" or "machine direction", reference is made to the direction of the plodded material passing through the compression cone out of the extrusion orifice. This movement is usually in a horizontal plane. The "shearing" or "cutting plane" is that plane between the two streams of the dually extruded material that is parallel to or defines the "medial" or "internal cut face". Normally, the shearing plane is vertical to provide side-by-side streams, rather than horizontal which would yield top and bottom streams. This plane is parallel to the "lateral" or "external cut face". The "transverse plane" defines the "transverse faces" of the plodded extruded material. This plane is perpendicular to the shearing plane which it meets at the extrusion axis.

By "soap" or "soap bar" the composition of the material includes soaps, detergents, or other washing agents and mixtures of such materials.

Figure 1:
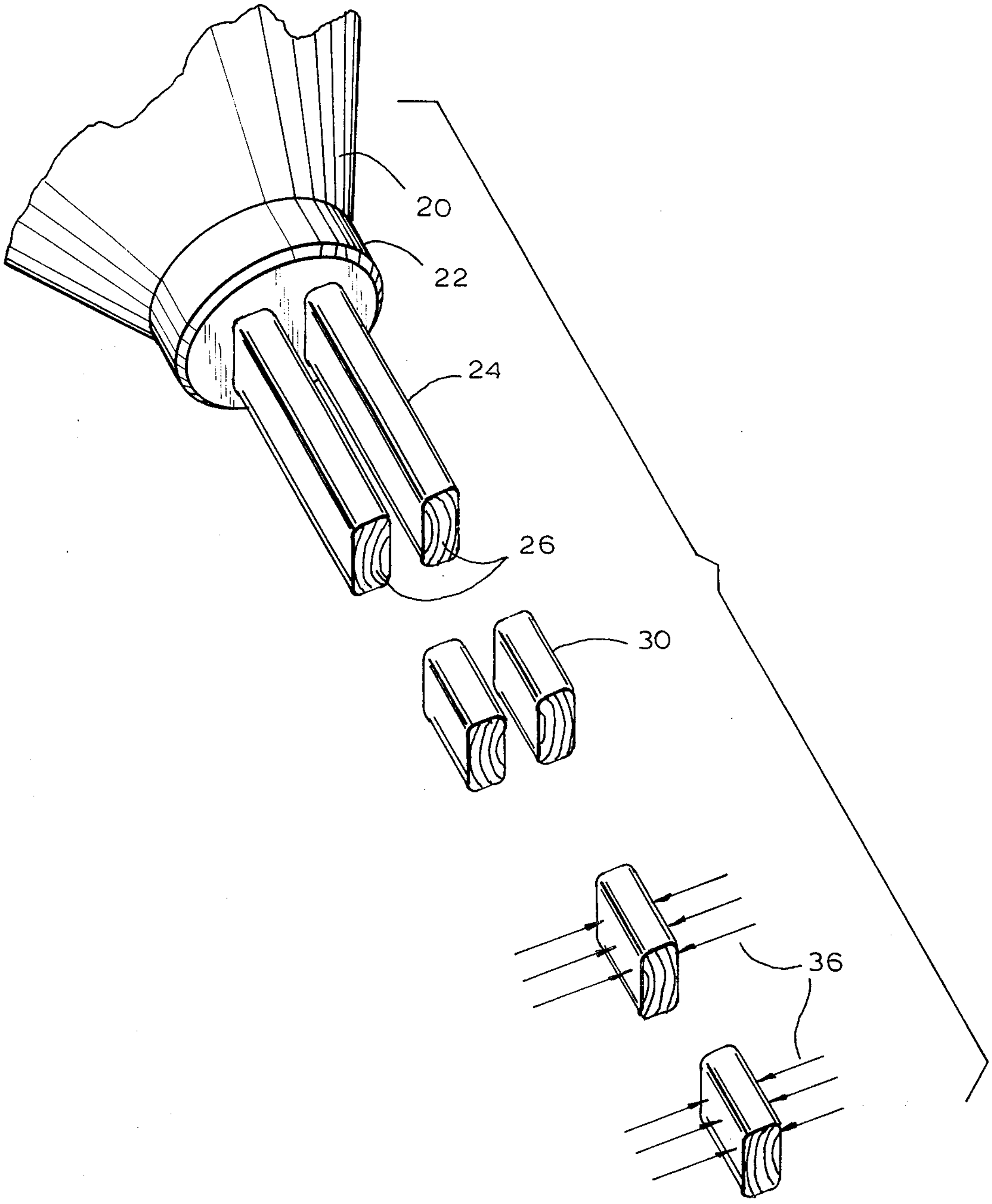
FIG. 1 is a perspective view of the process of the prior art.

FIG. 1 shows a dual extrusion plodder of the type known in the prior art which has a compression cone 20 which compacts the plodded soap material as it approaches nozzle plate 22, which has a predetermined cross sectional area.

Figure 4:
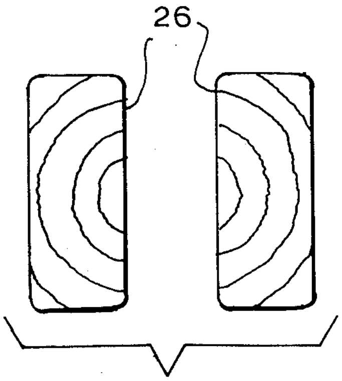
FIG. 4 PRIOR ART
FIG. 4 is a cross sectional view showing laminar stress present in prior art dual extruded soap billets.
Figure 5:
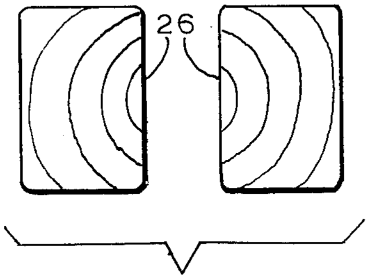
FIG. 5 PRIOR ART
FIG. 5 is a cross sectional view showing laminar stress present in prior art dual extruded soap billets of another shape.
Figure 6:
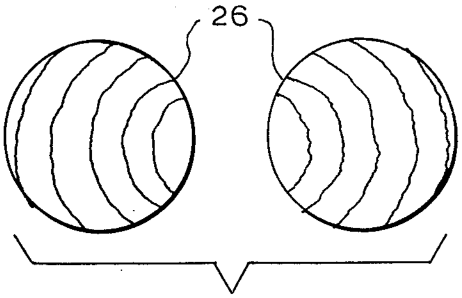
FIG. 6 PRIOR ART
FIG. 6 is a cross sectional view showing laminar stress present in prior art dual extruded soap billets of still another shape.
Figure 7:
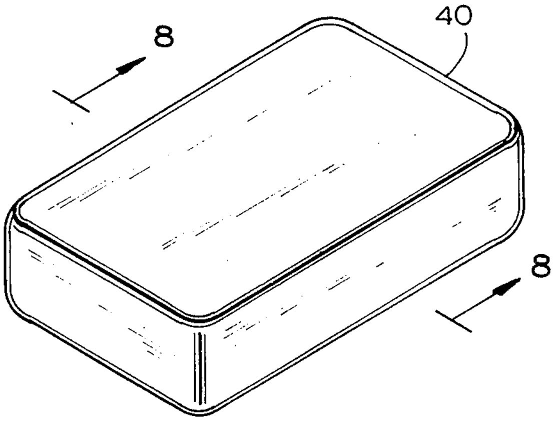
FIG. 7 PRIOR ART
FIG. 7 is a perspective view of a conventional banded soap bar.

The extruded soap mass 24 being advanced in the machine direction is divided into two streams, having their cross sections determined by the geometry of nozzle plate 22. As seen at 26, the cross sections show asymmetric stress patterns which are mirrored across the shearing plane. The separate streams 24 are cut into plodder soap blanks or billets 30 by conventional means (not here illustrated) at right angles to the machine direction. The plodder soap blanks or billets 30 are then pressed at 36 in a soap press (not shown) on their cut edges and other edges in the direction of the arrows as shown in the figure. Typical dual extruded plodder soap blanks or billets have cross sections and stress patterns of the type as shown in FIGS. 4, 5 and 6. When pressed into bars 40 or 50, the finished soaps have asymmetric stress patterns 42 or 52 which will lead to surface stress cracking or wet cracking when the bars are subjected to use.

Figure 2:
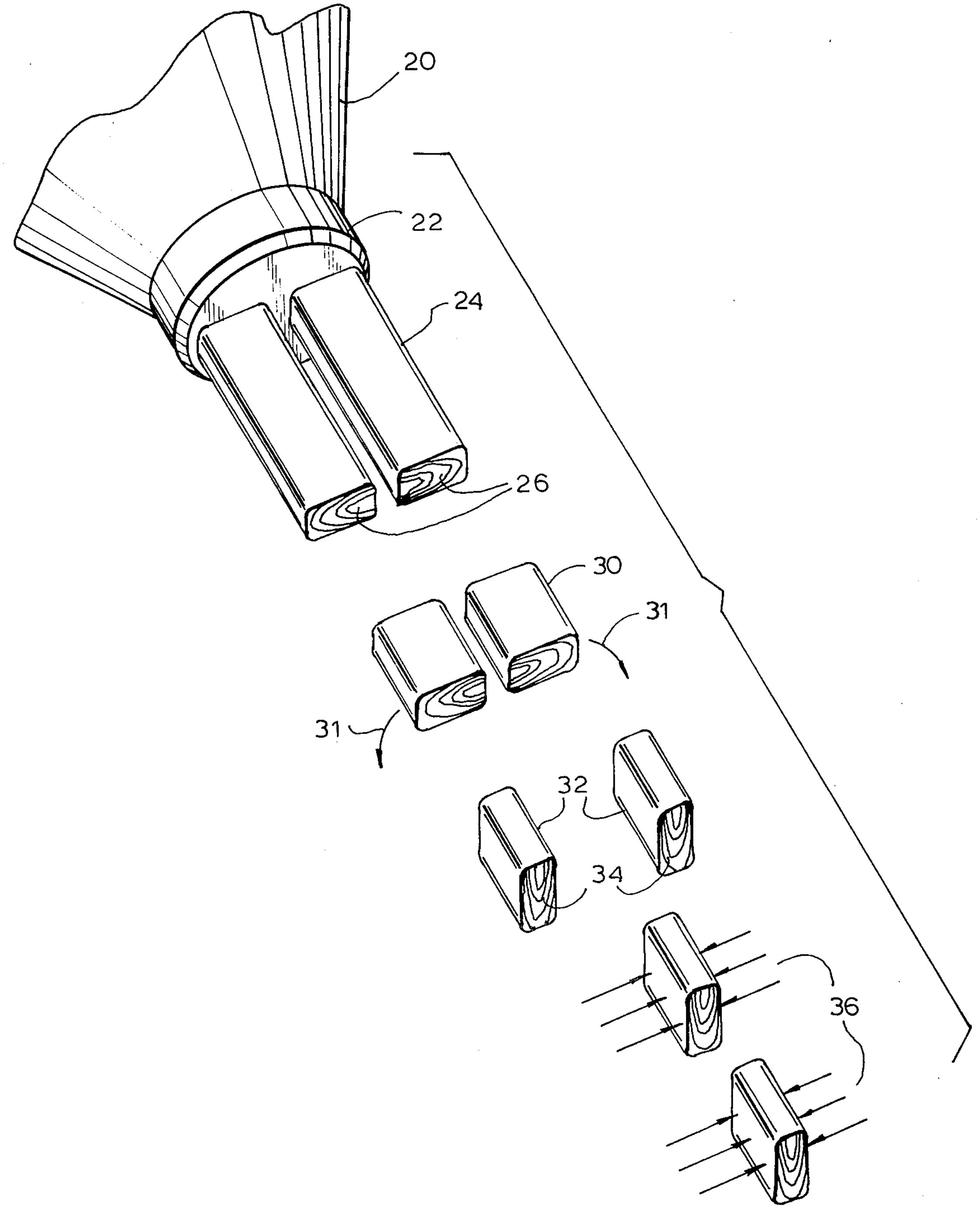
FIG. 2 is a perspective view of the process of one embodiment of the invention.

In accordance with the process of the invention, a conventional plodder 20 with an extrusion nozzle 22 with a cross section that is predetermined in view of the desired end shape and processing parameters is used to extrude soap mass 24 having stress pattern 26. The plodded soap mass 24 is cut into plodder soap blanks or billets 30. The plodder soap blanks or billets are rotated 90° about the extrusion axis as shown by the curved arrows 31 to align the plodder soap blanks or billets as shown at 32 so that the stress patterns of these plodder soap blanks or billets will be positioned as shown at 34. The rotated plodder soap blanks or billets are then pressed on their transverse faces in the direction shown by the arrows at 36 in FIGS. 2 and 3. The resulting soap bars are resistant to wet surface cracking.

Figure 8:
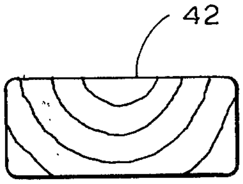
FIG. 8 is a cross sectional view of the bar of FIG. 7 taken on line 8—8.
Figure 9:
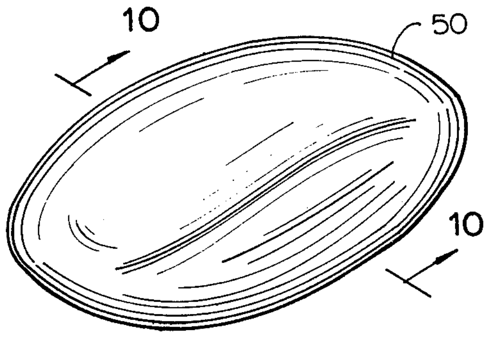
FIG. 9 is a perspective view of a conventional pillow or pin die shaped soap bar.
Figure 12:
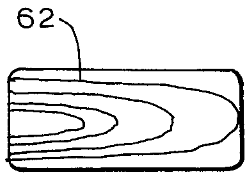
FIG. 12 is a cross sectional view of the soap bar of FIG. 11 taken on line 12—12.

FIGS. 11 through 14 illustrate the finished soap bars of the invention. FIG. 12 shows banded soap bar 60 which is preferably made by the process illustrated in FIG. 2 wherein the plodder soap blank or billet is a generally rectangular prism which is pressed so that the stress pattern of the bar has a folded in or compressed U-shaped pattern 62 as is shown in FIG. 12, rather than the open out stress pattern of the prior art which is shown in FIG. 8.

To make banded soap bars using a conventional die box press, it is preferred that the major dimension of the rectangular prism be coincident with the axis of extrusion and the minor dimension be the distance between the transverse faces so that the inside cut face and the outside face of the plodder soap blank or billet are against the sides of the die box and the movable dies act against the transverse faces.

Figure 3:
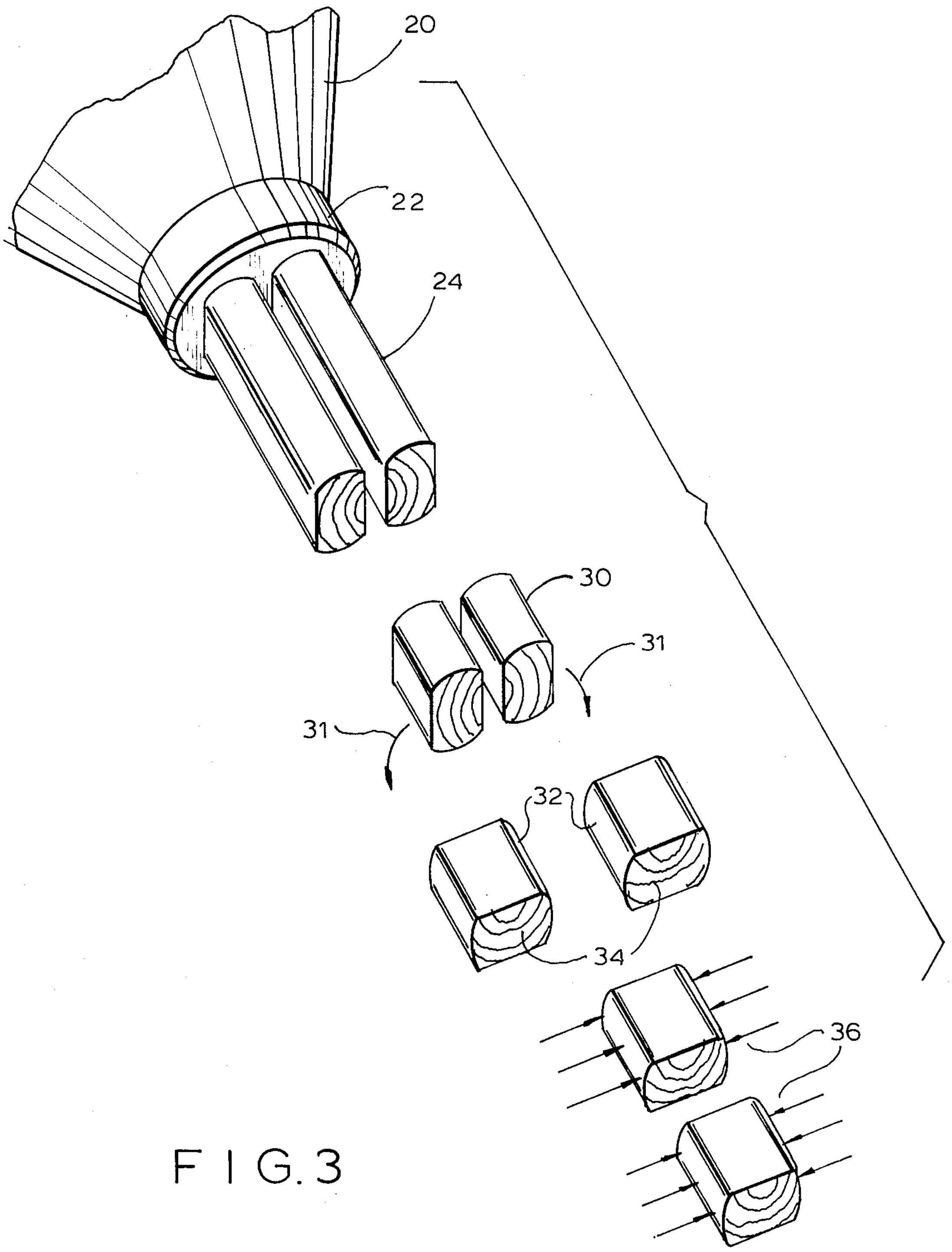
FIG. 3 is a perspective view of the process of a second embodiment of the invention.
Figure 10:
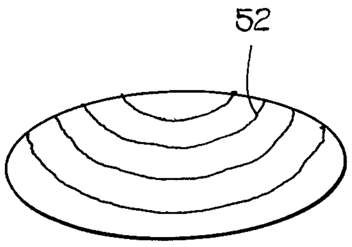
FIG. 10 is a cross sectional view of the soap bar of FIG. 9 taken on line 10—10.
Figure 11:
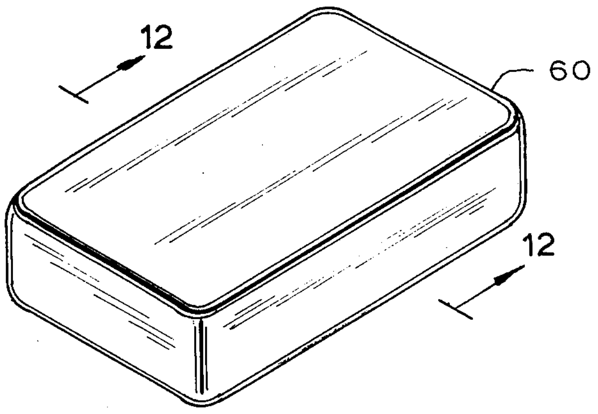
FIG. 11 is a perspective view of a banded soap bar in accordance with the invention.
Figure 13:
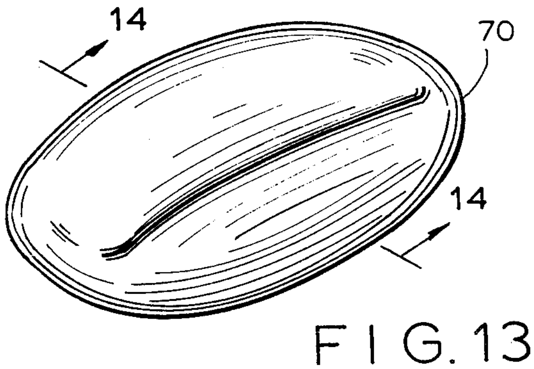
FIG. 13 is a perspective view of a pillow or pin die shape soap bar in accordance with the invention.
Figure 14:
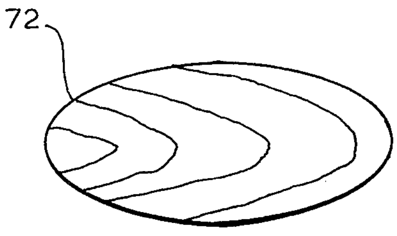
FIG. 14 is a cross sectional view of the soap bar of FIG. 13 taken on line 14—14.

By the same token, the pin die or pillow shaped soap 70 of FIG. 13, which is preferably made by the process of FIG. 3 wherein the plodder soap blanks or billets have almost equal transverse dimensions and lateral and medial dimensions, sometimes referred to as "semi-square" (because the transverse faces have arcuate surfaces) and are pressed in a capacity die on their transverse sides giving the stress pattern 72 which is also of a folded in or compressed U-shape as illustrated in FIG. 14 rather than the open pattern of the prior art as shown in FIG. 10.

Thus the invention allows for the formation by dual extrusion of pairs of soap plodder blanks or billets for virtually all soap formulas while forming a laminar or parallel stress pattern in the finished soap bars which are essentially free from stress surface cracks and objectionable wet cracking. Use of the invention permits dual extrusion to be utilized in all soap production thereby increasing production rates while reducing cost and delivering a better product. The production of striped, striated, marbleized or multicolored soaps can be facilitated with the process of the invention.

The unexpected improvement in the stress pattern of the finished soap bars due to the 90° rotation of the soap plodder blanks or billets and subsequent pressing on the transverse faces to impart a parallel or laminar stress pattern and thus eliminate stress surface cracks and wet surface cracking is the result of the invention.

This process is especially suitable for use with soap presses having multiple cavities so that more than one finished bar can be made per pressing cycle.

While the basic principle of the method of this invention has been illustrated and described herein, it will be appreciated by those skilled in the art that variations in the disclosed arrangement, both as to its details and as to the organization of such details, may be made without departing from the spirit and scope thereof. Accordingly, it is intended that the foregoing disclosure and drawings will be considered only illustrative of the principles of the invention and not construed in a limiting sense.

I claim:

1. A process for the elimination of wet surface cracking in dual extruded soaps comprising the steps of:

extruding two streams of plodded soap from a single cone dual extrusion nozzle, such streams of plodded soap having asymmetric stress patterns mirrored across the shearing plane of the single cone dual extrusion nozzle and transverse faces perpendicular to the shearing plane, cutting the two streams of plodded soap at right angles to the extrusion axis to form plodder soap blanks or billets of a predetermined size, rotating the plodder soap blanks or billets 90° to the shearing plane on an axis parallel to the extrusion axis, introducing the rotated plodder soap blanks or billets into a soap press having movable die elements so that the transverse faces of the plodder soap blanks or billets are in registry with the movable die elements, pressing the rotated plodder soap blanks or billets on their transverse faces to fold the asymmetric stress pattern upon itself to form crack-resistant pressed soap bars, and removing pressed soap bars from the soap press.

2. The process of claim 1 wherein the soap press is provided with multiple cavities to simultaneously form more than one finished soap bar per pressing cycle.

3. The process of claim 1 wherein the plodder soap blanks or billets are rectangular prisms whose major dimension is in the machine direction and whose minimum dimension is the distance between the transverse faces.

4. The process of claim 3 wherein the plodder soap blanks or billets are pressed in a die box to form banded soap bars.

5. The process of claim 1 wherein the plodder soap blanks or billets are solids with arcuate transverse faces whose major dimension is in the machine direction and whose transverse dimension and medial or lateral dimension are about equal.

6. The process of claim 5 wherein the plodder soap blanks or billets are pressed on a pin die press.

* * * * *